United States Patent [19]

Nakazato

[11] 4,315,640
[45] Feb. 16, 1982

[54] PASSIVE SAFETY BELT DEVICE FOR VEHICLES

[75] Inventor: Eiji Nakazato, Ohta, Japan

[73] Assignee: Fuji Jukogyo Kabushiki Kaisha, Tokyo, Japan

[21] Appl. No.: 71,167

[22] Filed: Aug. 30, 1979

[30] Foreign Application Priority Data

Sep. 8, 1978 [JP] Japan .............................. 53-110310
Sep. 8, 1978 [JP] Japan .............................. 53-110311

[51] Int. Cl.³ .............................................. B60R 21/10
[52] U.S. Cl. ................................... 280/808; 280/802
[58] Field of Search .............. 280/801, 802, 803, 804, 280/805, 806, 807, 808; 297/468, 469, 470, 474, 475, 476, 477, 478, 479, 480, 481, 482, 483, 484, 486

[56] References Cited

U.S. PATENT DOCUMENTS

| 3,567,247 | 3/1971 | Sobkow et al. | 280/808 |
| 3,608,963 | 9/1971 | Steere | 297/482 |
| 3,834,730 | 9/1974 | Kansier | 280/808 X |
| 3,897,963 | 8/1975 | Seiffert | 297/389 |
| 3,993,328 | 11/1976 | Henderson et al. | 280/807 |
| 4,004,829 | 1/1977 | Kato et al. | 280/802 |
| 4,119,344 | 10/1978 | Kondo | 297/482 X |
| 4,189,169 | 2/1980 | Meuser | 280/802 |
| 4,201,418 | 5/1980 | Reidelbach et al. | 297/474 |

FOREIGN PATENT DOCUMENTS

| 2300696 | 9/1976 | France | 280/804 |
| 1509920 | 10/1975 | United Kingdom | 280/803 |

Primary Examiner—Richard A. Bertsch
Assistant Examiner—Randall A. Schrecengost
Attorney, Agent, or Firm—Martin A. Farber

[57] ABSTRACT

A passive safety belt device for a vehicle having sashless doors, comprising a retractor provided on the floor at the central portion of the vehicle, a resilient support provided to upwardly extend from a rear portion of the sashless door, and a safety belt connected between the retractor and the resilient support. When the door is closed, the safety belt extends diagonally across the passenger's body and when the door is opened, the safety belt is positioned to permit the passenger to get in and get off the vehicle.

7 Claims, 9 Drawing Figures

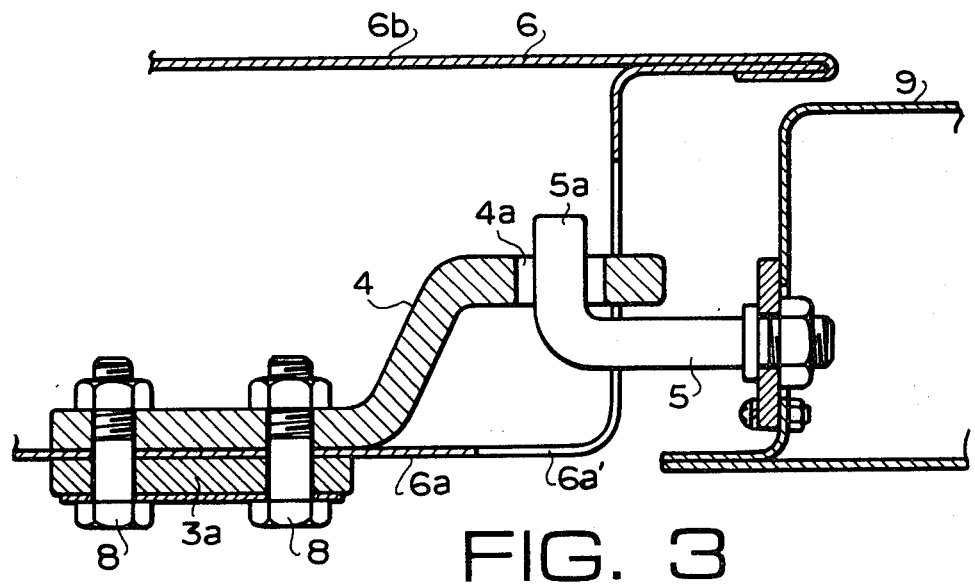
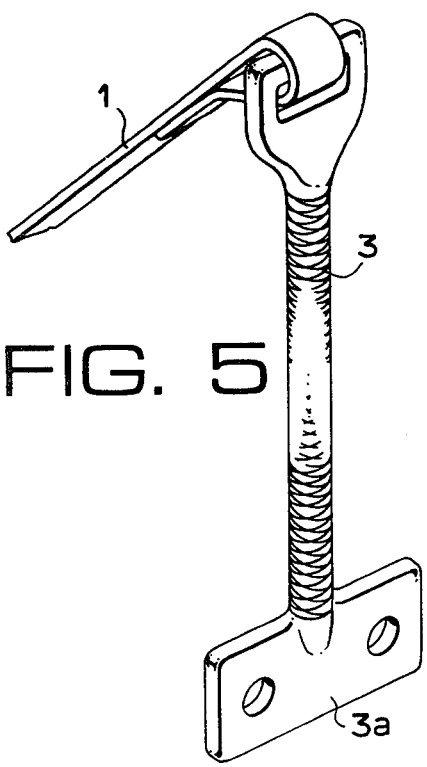
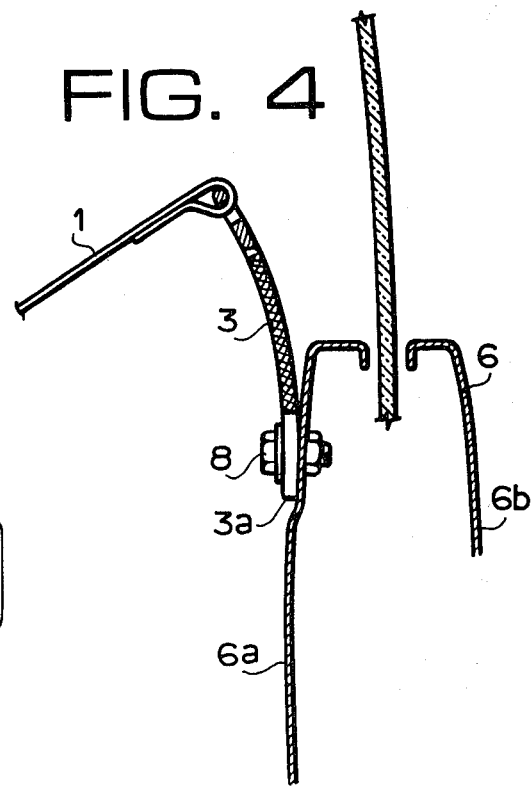

PASSIVE SAFETY BELT DEVICE FOR VEHICLES

BACKGROUND OF THE INVENTION

The present invention relates to a passive safety belt device for protecting a passenger seated in a vehicle, such as an automobile, from injury.

There has been provided a passive safety belt device in which a safety belt is automatically fitted to the passenger's body by closing the door of the vehicle such as an automobile and the safety belt is automatically removed from the passenger's body by opening the door, whereby the passenger is permitted to get out of the vehicle.

A passive safety belt device in which a safety belt extends diagonally across the passenger's body from one shoulder to the opposite hip is preferably employed in vehicles and this kind of safety belt is called a "shoulder belt." In the automatic passive safety belt device for the shoulder belt, the safety belt is connected between a retractor provided on a floor of a central portion of the vehicle and an anchor attached to a sash of the door adjacent the seat. However, the safety belt cannot be provided in a vehicle having sash-less doors. In order to attach the safety belt to the vehicle of sash-less door, a side rail is provided on an upper portion of the side of the vehicle body and the end of the safety belt is slidably engaged with the side rail. Further, a guiding device for moving the end of the safety belt longitudinally and a driving means for the guiding device are provided. Therefore, the conventional passive safety belt device is complicated in construction and expensive and requires a considerable space for installation thereof.

SUMMARY OF THE INVENTION

The present invention provides a passive safety belt device without any belt guiding device and belt driving mechanism.

According to the present invention, there is provided a safety belt device for a vehicle having sash-less doors, comprising a retractor provided in a lower portion of a central portion of the vehicle, a safety belt of which inner end is connected to said retractor and outer end is connected to a rear portion of said door, a resilient support means for holding a portion of said outer end of said safety belt upright, said retractor comprising a winding means and means for locking said safety belt when an excessive impact force is exerted on the retractor, said resilient support means having an elasticity capable of maintaining said safety belt in the upright position against the action of said winding means, whereby said safety belt extends diagonally across the passenger's body, when said door is closed.

The present invention will be fully described with reference to the accompanying drawings showing preferred embodiments.

BRIEF DESCRIPTION OF THE DRAWINGS

FIG. 3 is a horizontal sectional view of the door portion, FIG. 4 is a sectional view showing another embodiment of the present invention, FIG. 5 is a perspective view of a support member portion of the device shown in FIG. 4.

DESCRIPTION OF THE PREFERRED EMBODIMENTS

Figure 1:
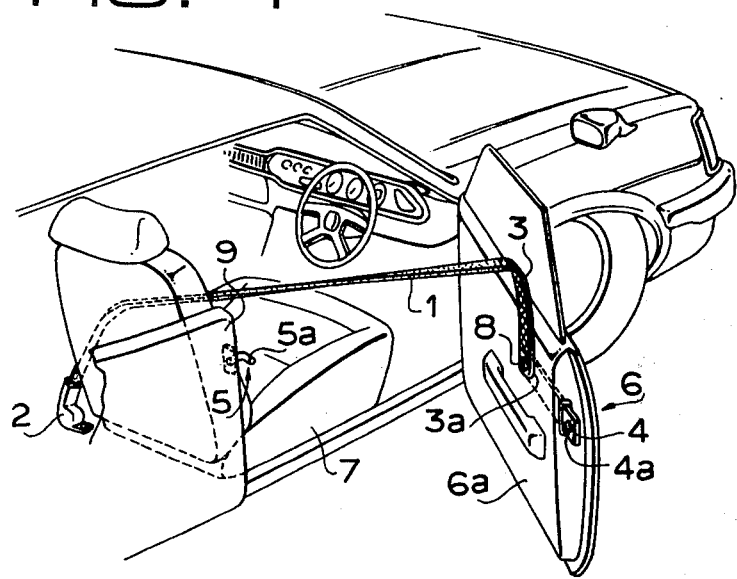
FIG. 1 is a perspective view showing an embodiment in an automobile according to the present invention.
Figure 2:
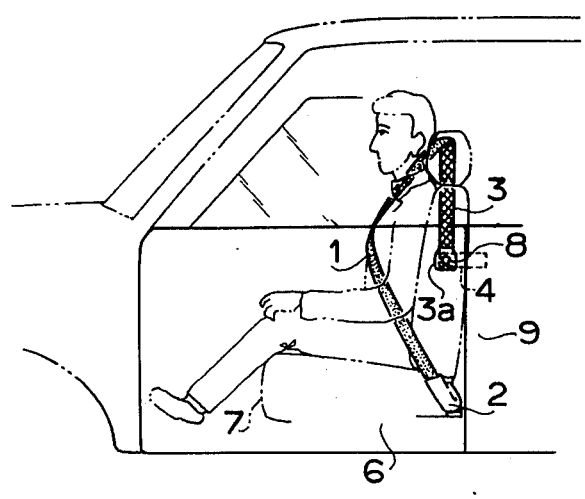
FIG. 2 is a side view of the device of FIG. 1.

Referring to FIGS. 1, 2 and 3, numeral 1 designates a safety belt. An inner end of the safety belt is connected to a retractor 2 provided on a central body member between seats 7, such as a floor or a member secured to the floor, and the outer end of the belt is integrally connected to an upper end of an upwardly extending support member 3 provided on the door 6 at a rear portion thereof.

The support member 3 is a resilient extended member made of flexible-wire which is formed by braiding steel wires or made of a resilient member which is formed by embedding steel wires in resilient material such as rubber. The support member is so constructed as to have an elasticity such that it extends upright against the retracting action of the retractor 2 in usual operation.

A lower end 3a of the support member 3 is secured to an inner panel 6a of the door 6 by bolts 8 together with a lock plate 4 as shown in FIG. 3. The lock plate 4 has a hole 4a into which an engaging portion 5a of a lock bolt 5 secured to a pillar 9 of the body enters passing through an opening 6a' upon closing of the door 6. Thus, impact force exerted on the support member 3 acts on the pillar 9 through the lock plate 4 and the lock bolt 5 thereby to free the panel of the door 6 from a great impact force.

In operation, when the door 6 is closed, the upper end of the upright support member 3 is positioned outside and behind the shoulder of the passenger as shown in FIG. 2. The safety belt 1 is wound in the retractor 2, so that the safety belt extends diagonally across the passenger from his left shoulder to his right hip to restrain the passenger's body at a predetermined pressure. When the door is opened, the rear portion of the door moves outwardly and forwardly. Thus, the safety belt is pulled from the retractor 2 and positioned to permit the passenger to get in and get out of the automobile as shown in FIG. 1. It will be noted that the support member 3 is kept in the upright position during such a door operation. The retractor 2 comprises, for example, a winding drum urged by a spring to wind up the safety belt and a locking device which is so designed as to permit the rotation of the winding drum during normal retraction of the safety belt and to restrict the rotation of the drum when the locking device is subjected to a load greater than a predetermined value upon an impact.

When an impact force higher than a predetermined value acts on the safety belt 1, the support member 3 is deflected and the impact force is applied to the bolts 8, which in turn is transmitted to the pillar 9 through the lock plate 4 and the lock bolt 5. Accordingly, the inner panel 6a of the door is prevented from deformation.

If there is provided on the inner panel 6a a reinforcement means which may bear the impact force, it is not always necessary to provide a locking means such as the above described lock plate 4 and lock bolt 5. FIGS. 4 and 5 show an example provided with such a reinforcement means. The lower end 3a of the support member 3 is secured to the inner panel 6a having a sufficient strength by bolts (not shown). The safety belt 1 is connected to the upper end of the support member. Thus an impact force is applied to the pillar 9 through the door 6 and a latch means of the door (not shown).

Figure 6:
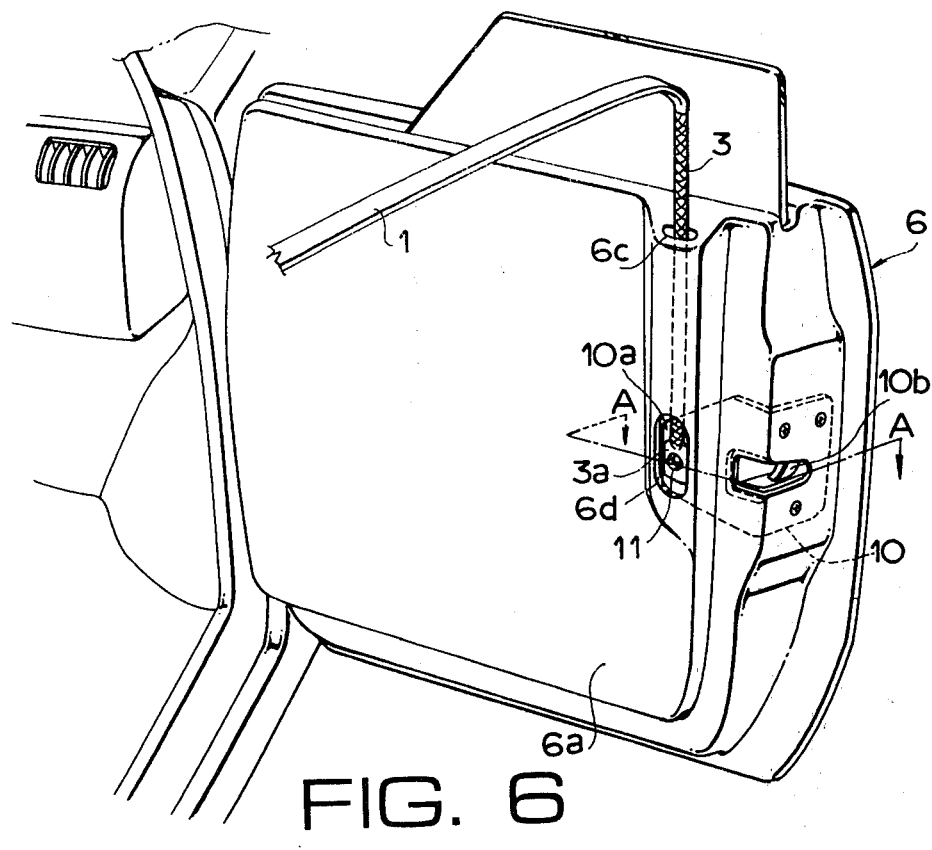
FIG. 6 is a perspective view of a further embodiment of the present invention.
Figure 7:
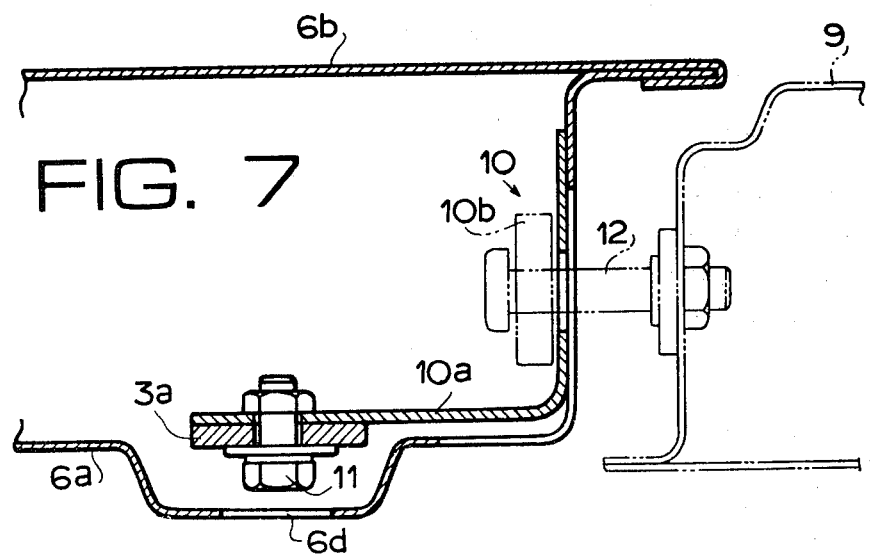
FIG. 7 is a sectional view taken along the line A—A in FIG. 6.
Figure 8:
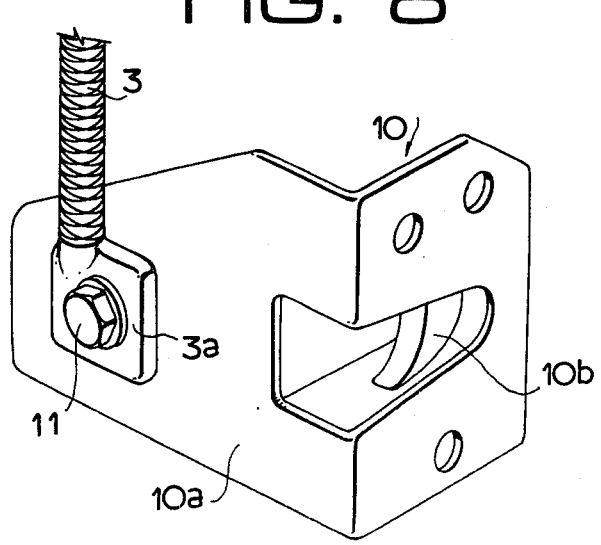
FIG. 8 is a perspective view showing an end portion of a safety belt.

Referring to FIGS. 6 to 8 showing another embodiment of the present invention, the support member 3 is inserted into the space between inner panel 6a and the outer panel 6b through an opening 6c. The lower end 3a of the support member 3 is secured to a base 10a of a door latch device 10 by a bolt 11. The base 10a is secured to an end portion of the door 6 opposite the pillar 9 by bolts. The door latch device 10 has a latch member 10b which engages a door striker 12 in the closed position of the door. The door latch device further comprises, as is well known, a not shown detent lever for holding the engaging state of the latch member 10b and an operating lever for releasing the detent lever. In accordance with the present invention, the base 10a is forwardly extended for providing a portion for securing the support member 3. In the inner panel 6a, an opening 6d is provided to permit the access to the lower end 3a of the support member 3.

With the above described construction, an impact force exerted on the safety belt 1 is transmitted to the pillar 9 through the bolt 11, base 10a and door striker 12. Since the periphery of the opening 6c is subjected to a part of the impact force, the portion is reinforced so as to bear the load.

Figure 9:
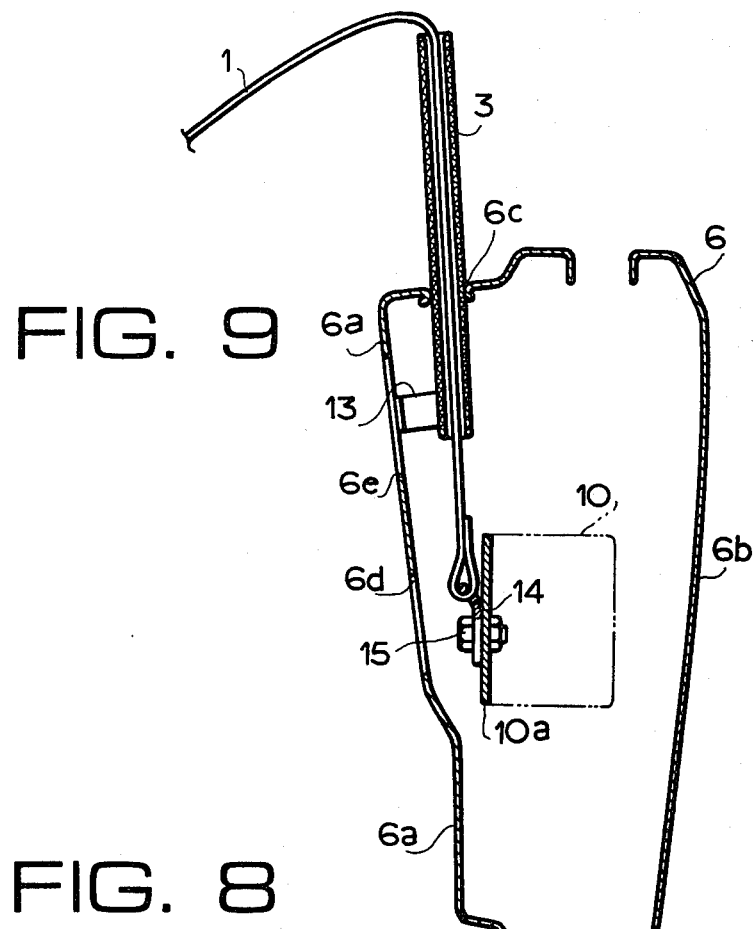
FIG. 9 is a sectional view showing a door portion.

Referring to FIG. 9 showing another embodiment of the present invention, the support member 3 is a resilient tube, the lower portion of which is secured to the inner panel 6a with a bracket 13 by a bolt (not shown). The bolt engages with a slit 6e of the inner panel 6a, so that the support member 3 may be adjusted in its height by sliding the bracket 13 along the slit 6e. The safety belt 1 is inserted into the tubular support member 3 and its lower end is connected to an anchor 14 secured to the base 10a by a bolt 15. The tubular support member 3 has an elasticity sufficient to hold the safety belt against the action of the retractor.

In this embodiment, when an impact force acts on the safety belt, the support member 3 is deflected and the impact force is received by the pillar 9 through the base 10a and the door striker 12 (as in the previous embodiment).

As described above, in accordance with the present invention, the safety belt is connected between a rear portion of the sash-less door and the retractor provided on the central portion of the floor of the vehicle and the resilient support member is provided on the sash-less door at the rear portion of the door so as to maintain the safety belt upright, whereby the safety belt extends diagonally across the passenger's body in the closed position of the door and the safety belt is positioned to permit to the passenger to get in and get out of the automobile. Thus, the present invention may provide an economical passive safety belt device without a driving mechanism and a guiding device such as a rail. In addition, it is possible to receive the impact force by the body of the automobile by such a construction that the impact force is transmitted to the body member of the automobile through the door latch device. Thus, the passenger's safety may be further enhanced.

What is claimed is:

1. A passive safety belt device for a vehicle having a sash-less door with a glass mounted therein, comprising a seat having a backrest,
a retractor disposed in a lower portion of a central portion of the vehicle,
a safety belt unit comprising a seat belt and a resilient support means operatively connected together, said safety belt unit having an inner end connected to said retractor and an outer end,
means comprising a member on said door for connecting said outer end of said safety belt unit,
said resilient support means has an uppermost portion engaging an upper outer portion of said safety belt for holding said upper outer portion of said safety belt up above the backrest of the vehicle in a normal condition,
said retractor comprising a winding means and means for locking said safety belt when an excessive impact force is exerted on the retractor,
said resilient support means having an elasticity for maintaining itself in a substantially upright position with said uppermost portion above the backrest of the seat of the vehicle higher than a passenger's shoulder against the action of said winding means when said door is closed, whereby said safety belt extends diagonally across the passenger's body,
said door is formed with a space and an opening in an upper portion of said door, said opening communicates with said space,
said resilient support means is a tubular member inserted into said space of said door through said opening, said tubular member is secured to said door and said safety belt is inserted through said tubular member, and
said outer end of the safety belt unit constitutes an outer end of said safety belt connected to said member.

2. The passive safety belt device for a vehicle as set forth in claim 1, wherein
said member is a door latch device.

3. The passive safety belt device according to claim 1, further comprising
a bracket for vertically adjustably securing said tubular member to said door,
said outer end of said safety belt also constitutes a lower portion thereof,
said member further includes a base secured to said door,
an anchor secured to said base and connected to said lower portion of said safety belt,
said base is formed with a latch member,
a striker mounted on a body portion of the vehicle and adapted to engage said latch member in a closed position of the door.

4. A passive safety belt device for a vehicle having a sash-less door with a glass mounted therein, comprising
a seat having a backrest,
a retractor disposed in a lower portion of a central portion of the vehicle,
a safety belt unit comprising a seat belt and a resilient support means operatively connected together, said safety belt unit having an inner end connected to said retractor and an outer end,
means comprising a member on said door for connecting said outer end of said safety belt unit,
said resilient support means has an uppermost portion engaging an upper outer portion of said safety belt for holding said upper outer portion of said safety belt up above the backrest of the vehicle in a normal condition, said retractor comprising a winding means and means for locking said safety belt when an excessive impact force is exerted on the retractor, said resilient support means having an elasticity for maintaining itself in a substantially upright position with said uppermost portion above the backrest of the seat of the vehicle higher than a passenger's shoulder against the action of said winding means when said door is closed, whereby said safety belt extends diagonally across the passenger's body, said upper outer portion of said safety belt and said uppermost portion of said resilient support means are integrally connected with each other, said door is formed with a space and an opening in an upper portion of said door, said opening communicates with said space, a lower end of said resilient support means, constituting said outer end of said safety belt unit, is inserted into said space in the door through said opening of said door body, said member comprises a door latch device having a base secured to said lower end of said resilient support means, a bolt means for securing said base to said lower end of said resilient support means, said base is L-shaped and has an end portion remote from said bolt means formed with an opening secured to a lateral end portion of the door, said lateral end portion is formed with an opening aligned with said opening of said base, a latch member constituting a part of said door latch device is disposed adjacent said openings, a door striker disposed on a body portion of the vehicle and adapted to engage said latch member in a closed position of the door.

5. The passive safety belt device for a vehicle as set forth in claim 4, wherein
said door is formed with another opening adjacent said bolt means.

6. The passive safety belt device for a vehicle as set forth in claim 1 or 4, wherein
said resilient support means comprises a plurality of braided steel wires.

7. The passive safety belt device as set forth in claim 1 or 4, wherein
said resilient support means comprises a resilient material with steel wires therein.

* * * * *